United States Patent
Ren et al.

(10) Patent No.: US 11,908,084 B2
(45) Date of Patent: Feb. 20, 2024

(54) METHOD FOR GENERATING HIGH-QUALITY REAL-TIME ISOSURFACE MESH

(71) Applicant: ZHEJIANG UNIVERSITY, Hangzhou (CN)

(72) Inventors: Zhong Ren, Hangzhou (CN); Jiahui Hao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 62 days.

(21) Appl. No.: 17/553,681

(22) Filed: Dec. 16, 2021

(65) Prior Publication Data
US 2022/0108527 A1 Apr. 7, 2022

Related U.S. Application Data

(63) Continuation of application No. PCT/CN2020/112356, filed on Aug. 31, 2020.

(51) Int. Cl.
*G06T 17/20* (2006.01)
*G06T 17/10* (2006.01)
*G06T 15/30* (2011.01)

(52) U.S. Cl.
CPC ........... *G06T 17/205* (2013.01); *G06T 15/30* (2013.01); *G06T 17/10* (2013.01)

(58) Field of Classification Search
None
See application file for complete search history.

(56) References Cited

U.S. PATENT DOCUMENTS 7,538,764 B2 * 5/2009 Salomie ................. G06T 17/20
380/232
2020/0082618 A1 3/2020 Lu et al.

FOREIGN PATENT DOCUMENTS

CN 103839292 A 6/2014
CN 109509259 A 3/2019

OTHER PUBLICATIONS

Lis Custodio et al, "An extended triangulation to the Marching Cubes 33 algorithm", Journal of the Brazilian Computer Society (2019) 25:6, https://doi.org/10.1186/s13173-019-0086-6 (Year: 2019).*

(Continued)

*Primary Examiner* — Tize Ma
(74) *Attorney, Agent, or Firm* — W&G Law Group

(57) ABSTRACT

Provided is a method for generating high-quality isosurface mesh in real time, which takes the Marching Cubes algorithm as a baseline to efficiently generate a high-quality mesh of a 3D model, re-examines the case table in the MC algorithm, and puts forward the concept of equivalent edges. By combining with the remeshing technology, the MC algorithm is optimized from three aspects: deleting equivalent edges with the worst performance from the case table by using connectivity modification and vertex insertion technology; changing the geometric shape of the active edge to make it more perpendicular to the isosurface; and moving the shared cut points of cube cells. According to the present application, the mesh with a higher quality is generated at the running speed close to the standard MC algorithm, and the mesh quality is close to the post-processing remeshing algorithm with extremely high time consumption.

4 Claims, 2 Drawing Sheets

(56) References Cited

OTHER PUBLICATIONS

William E. Lorensen et al, "Marching Cubes: A High Resolution 3D Surface Construction Algorithm", Computer Graphics, vol. 21, No. 4, Jul. 1987 (Year: 1987).*

Timothy S. Newman, Hong Yi, "A survey of the marching cubes algorithm", Computers & Graphics 30 (2006) 854-879 (Year: 2006).*

Sundaresan Raman and Rephael Wenger y, "Quality Isosurface Mesh Generation Using an Extended Marching Cubes Lookup Table", Eurographics/ IEEE-VGTC Symposium on Visualization 2008, vol. 27 (2008), No. 3 (Year: 2008).*

International Search Report (PCT/CN2020/112356); dated May 28, 2021.

High-quality isosurface generation using an oversampling method; Date of Mailing: Mar. 24, 2006.

* cited by examiner

METHOD FOR GENERATING HIGH-QUALITY REAL-TIME ISOSURFACE MESH

CROSS-REFERENCE TO RELATED APPLICATIONS

The present application is a continuation of International Application No. PCT/CN2020/112356, filed on Aug. 31, 2020, the content of which is incorporated herein by reference in its entirety.

TECHNICAL FIELD

The present application belongs to the field of computer graphics, and particularly relates to a method for generating high-quality isosurface mesh in real time.

BACKGROUND

The isosurface extraction algorithm is one of the main computing components in the processing pipeline of many algorithms and applications, especially in the real-time reconstruction of 3D scenes. Scientific visualization applications based on augmented reality almost always need the capability to render an isosurface in real time, which is usually realized by first converting an implicit surface into a triangular mesh, and then rendering the triangular mesh. Of course, for more applications, subsequent operations and processing need to be carried out on the generated mesh, such as simulation of collision and deformation, interaction between a virtual scene and a real scene, and so on. These applications require not only good quality of the input mesh, but also high real-time performance of the mesh generation algorithm. The Marching Cubes algorithm (hereinafter referred to as the MC algorithm) is the most classic and widely used method for computing an isosurface. The reason why the MC algorithm becomes the most popular isosurface extraction algorithm mainly depends on its important algorithm features such as simplicity, high efficiency and robustness. However, the MC algorithm will produce a large number of triangles with a low quality. Therefore, the mesh generated by the MC algorithm and its variants still needs additional post-processing steps to improve the quality of the triangular mesh. With the continuous improvement of the computing power, the simulation process in real-time applications has become very complex, and the low-quality mesh generated by the standard MC algorithm hinders their performance. Powerful post-processing algorithms can significantly improve the quality of meshes. They can even process meshes to high-quality meshes almost all of which are equilateral triangles through excellent remeshing algorithms. However, they cannot be used in real-time applications because of their time consumption at a minute level. Therefore, by improving the core steps of the MC algorithm, a mesh with improved quality can be generated in real time, which can ensure good real-time performance and get a higher quality mesh. For the Marching Cubes algorithm, reference can be made to "Lorensen W E, Cline H E. Marching cubes: A high resolution 3D surface construction algorithm[J]. ACM siggraph computer graphics, 1987, 21(4): 163-169"; for the remeshing algorithm, reference can be made to the literature: "Iliez P, Ucelli G, Gotsman C, et al. Recent advances in remeshing of surfaces[M]//Shape analysis and structuring. Springer, Berlin, Heidelberg, 2008: 53-82."; for the improvement of the Marching Cubes algorithm, reference can be made to the literature: "Newman T S, Yi H. A survey of the marching cubes algorithm[J]. Computers & Graphics, 2006, 30(5): 854-879.".

SUMMARY

In view of the defects of the prior art, the present application aims to provide a method for generating high-quality isosurface mesh in real time. The method utilizes an isosurface extraction technology of a 3D model and generates a high-quality mesh in real time based on the Marching Cubes algorithm.

The purpose of the present application is realized by the following technical solution: a method for generating high-quality isosurface mesh in real time includes the following steps:

(1) constructing equivalent edges of each triangle in a case of the MC algorithm;
(2) inputting voxel data of a certain 3D model and setting an isosurface value;
(3) evenly dividing the voxel data into individual cube cells, and marking each cell vertex with a sign according to a size relationship between a value at the cell vertex and the isosurface value;
(4) according to the signs marked in step (3), determining a case to which a current cell belongs by comparing with the case in the MC algorithm;
(5) after the case is determined, generating an index according to vertex index rules of the MC algorithm, and querying an active edge table in the MC algorithm to obtain a set of edges where the isosurface intersects the current cube cell, and obtaining the equivalent edges configuration of each triangle in the current cell according to step (1);
(6) evaluating quality performance of the equivalent edges corresponding to the triangle;
(7) using a connectivity modification method in remeshing technology to eliminate the equivalent edge with the worst quality performance;
(8) inserting new vertices in the cell to construct new equivalent edges for the worst equivalent edge which cannot be eliminated in step (7);
(9) moving an active edge to make the active edge more perpendicular to the isosurface to improve the quality of the equivalent edges of the triangle;
(10) selecting a next cube cell and repeating steps (4)-(10) until all cube cells divided in step (3) are traversed;
(11) splicing all cube cells together in such a manner that triangle vertices on the edges of adjacent cube cells coincide;
(12) moving a triangle vertex shared by no less than 6 triangles on an edge of the cube cell to a midpoint of the edge to obtain a final mesh output.

Furthermore, the step (1) includes the following substeps:
(1.1) splitting a triangulation combination in an individual case of the MC algorithm into individual triangles;
(1.2) there being 8 distributions of edges where the vertices of the triangle are located, and each distribution constituting a group of equivalent edges.

Furthermore, the step (6) includes the following substeps:
(6.1) taking a ratio of a radius of an inscribed circle to that of a circumscribed circle of the triangle as a quality evaluation metric, and drawing a quality distribution map;
(6.2) according to the quality distribution map, evaluating the equivalent edge which can reach an upper quality limit but cannot reach a lower quality limit as having excellent performance; evaluating the equivalent edge which can reach the upper quality limit and the lower quality limit as having good performance; and evaluating equivalent edge that cannot reach the upper quality limit but can reach the lower quality limit as having worst performance.

Furthermore, the step (8) includes the following sub-steps:

(8.1) finding out the longest edge of the triangle in the current cube cell;

(8.2) inserting a new vertex at the midpoint of the longest edge found out in step (8.1), and then connecting other triangle vertices to the newly inserted vertex respectively.

Furthermore, the step (9) includes the following sub-steps:

(9.1) determining the gradient direction from two end points of each active edge of the cube cell to the isosurface and the vertical direction of the gradient direction;

(9.2) taking one end point of the active edge as a starting point, drawing an extension line along the vertical direction of the gradient direction from the starting point to the isosurface, taking another end point of the active edge as a starting point, and drawing an extension line along the gradient direction from the starting point to the isosurface; similarly, exchanging the two end points and drawing extension lines to obtain another intersection point; the two intersection points and the two end points forming a quadrilateral, and taking midpoints of two edges parallel to the gradient direction in the quadrilateral as end points of a new active edge.

Furthermore, in step (12), a gain function is used to modulate a displacement distance.

The method has the following beneficial effects: an equivalent edge framework is innovatively proposed and used in the present application, the quality of the mesh generated by the MC algorithm is systematically analyzed, a brand-new case table of the MC algorithm is designed, most cases with poor performance are eliminated, and the occurrence possibility of degraded triangles in the mesh is basically prevented; in view of other cases which cannot be completely eliminated, the present application summarizes the relationship between the performance of equivalent edges and the position of the incident active edge of the mesh edge by classifying the equivalent edges, and uses the edge deformation technology to split and move the vertices of the cube cell, thereby optimizing the incident angle of the mesh edge and improving the quality performance of specific cases. The two optimization processes can be naturally embedded into the original MC algorithm. The combination of the two makes the algorithm effectively improve the quality of the generated mesh without losing the simplicity and efficiency of the MC algorithm, and approaches the mesh quality of the mesh post-processing algorithm with the running speed close to the real-time algorithm. According to the present application, a scientific parameter selection method is adopted to optimize the running effect of the algorithm, and an efficient approximate algorithm with a good approximation effect is designed to replace the complicated calculation process of the edge deformation technology, so that the algorithm has a better real-time performance. The method can be applied to many real-time graphics systems such as 3D reconstruction, augmented reality and the like, and has wide application space, the algorithm has good real-time performance and simplicity, and the quality and fidelity of the generated mesh are better improved than those of the existing methods.

DESCRIPTION OF EMBODIMENTS

The present application will be further explained with reference to the attached drawings and specific embodiments.

Figure 1:
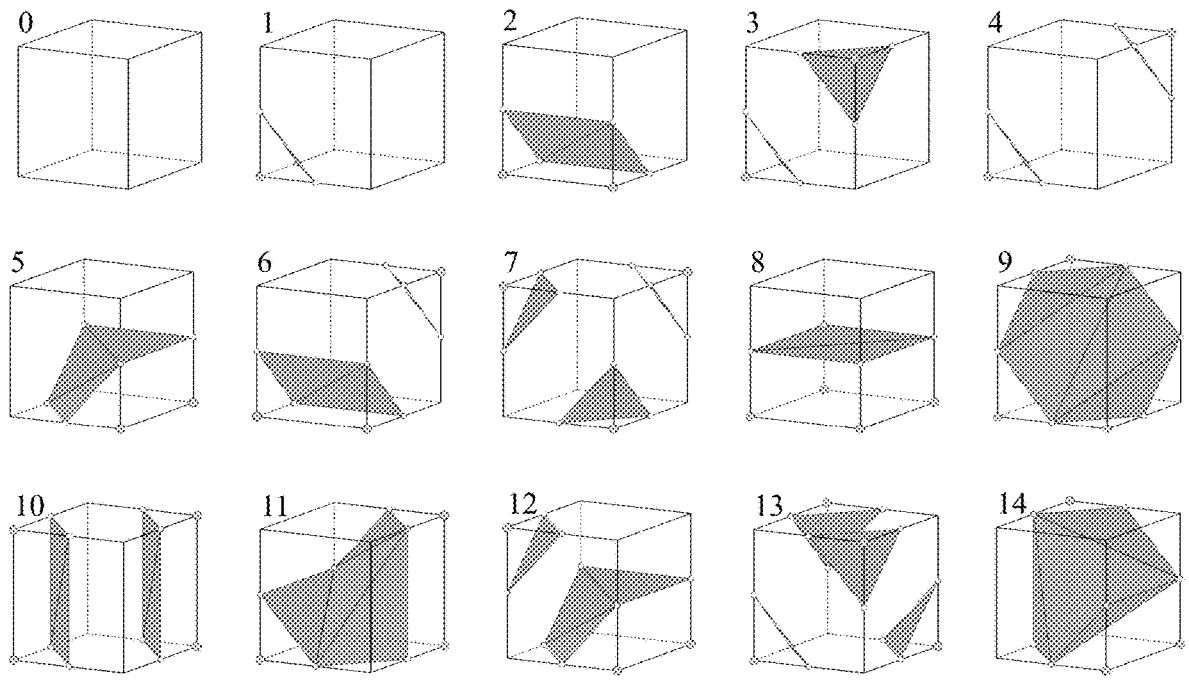
FIG. 1 is a schematic diagram of case distribution of cube cells in the MC algorithm, wherein there are 15 basic cases, eight vertices of each cube cell are divided into positive and negative groups, the positive vertices have no special marks, and the negative vertices are represented by solid vertices; triangulation indicates the distribution and connection order of vertices of triangulation on the inner edge of the cell in this case, and vertices of triangulation are represented by hollow circles; the number in the upper left corner is the number of the case.

A method for generating high-quality isosurface mesh in real time comprises the following steps:

(1) Equivalent edges are constructed, which includes the following sub-steps:

(1.1) The triangulation combination composed of multiple triangles in an individual case of the MC algorithm are split into individual triangles in turn; the case of MC algorithm is shown in FIG. 1.

Figure 2:
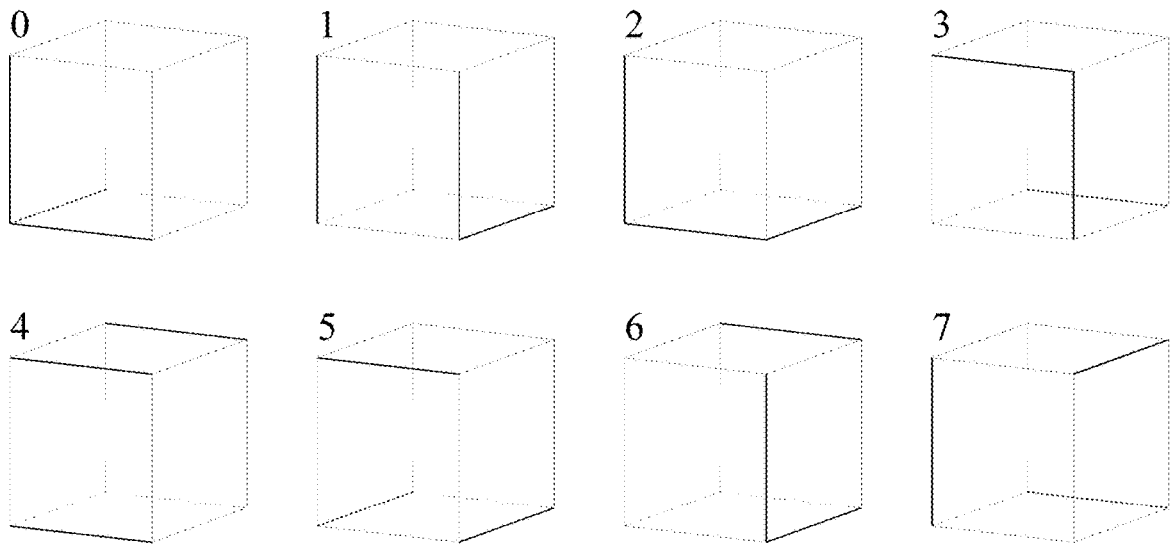
FIG. 2 is a schematic diagram of eight groups of equivalent edges; each group of equivalent edges is distinguished by the relative position relationship among the three edges, such as intersection, parallel and different planes, and by combining these equivalent edges, each case in the MC algorithm can be obtained; the number in the upper left corner is the number of the equivalent edge.

(1.2) After splitting all cases, a limited number of types of individual triangles can be obtained, and the types of triangles are determined by the relative positions of the three edges that make up the triangles. By obtaining the distribution of triangles in all cases, it can be seen that there are 8 kinds of distribution of edges where the vertices of triangles are located, as shown in FIG. 2, and all the edge configurations existing in the MC algorithm can be obtained, that is, the distribution of edges where the vertices of each triangle are located constitutes a group of equivalent edges.

(2) An isosurface value is set to obtain the mesh of the input voxel data of a 3D model at the isosurface value.

(3) The voxel data is evenly divided into individual cube cells, each cell having 8 vertices, and each vertex is marked with a sign according to the size relationship between the value at the vertex and the isosurface value; it is only necessary to ensure that the vertex signs for being larger and being smaller than the case are opposite, and the sign for being equal to the case can be arbitrarily set.

(4) According to the signs marked in step (3), the case to which the current cell belongs is determined by comparing with the case of the MC algorithm.

(5) After the case is determined, the index is generated according to the vertex index rule of the standard MC algorithm, and the set of edges (active edges) where the isosurface intersects with the current cube cell is obtained by indexing the active edge table in the standard MC algorithm, and all the active edge configurations on the cube cell are determined, and the equivalent edges of each triangle are obtained according to step (1).

(6) Evaluation of the quality performance of a triangle includes the following sub-steps:

(6.1) The quality of the triangle formed by each group of equivalent edges can be analyzed in cube cells. Because the vertices of the triangle must move on definite edges (i.e., line segments), their quality is constrained; the ratio of the radius of an inscribed circle to that a circumscribed circle of triangle is taken as the quality evaluation metric, and the closer the triangle is to an equilateral triangle, the higher the quality, with the minimum value being the lower limit of quality and the maximum value being the upper limit of quality, and a quality distribution map with the triangular quality on the horizontal axis and the distribution probability on the vertical axis is drawn. The distribution probability of the quality evaluation index not being zero means it can be achieved, and the distribution probability being zero means it will not be achieved.

(6.2) The quality performance is evaluated according to the quality distribution map, and the equivalent edges 4, 5 and 7 which can reach the upper quality limit but will not reach the lower quality limit are evaluated as having excellent performance; equivalent edges 0, 1, 3 and 6 which can reach the upper and lower quality limits are evaluated as having good performance; equivalent edge 2 which cannot reach the upper quality limit but will reach the lower quality limit is evaluated as having the worst performance.

Figure 3:
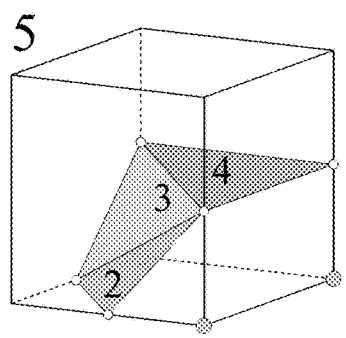
FIG. 3 is a schematic diagram of connectivity modification solution; the numbers on each surface identify seven groups of equivalent edges in the three cases; the upper three are the original triangulation modes in the three MC cases, while the lower three show the connectivity modified by the present application; after reconnection, the equivalent edge 2 with the worst performance in these cells are deleted in the present application; the number in the upper left corner is the number of the case.
Figure 3:
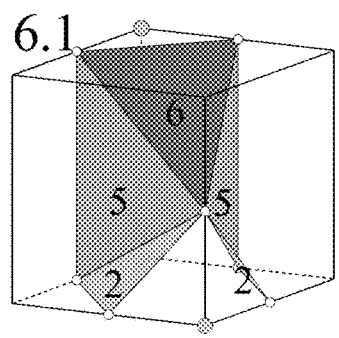
Figure 3:
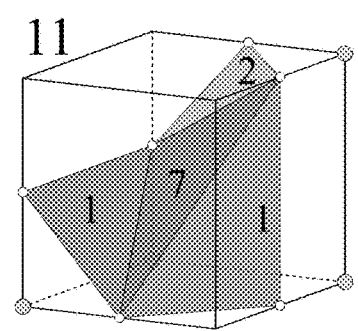
Figure 3:
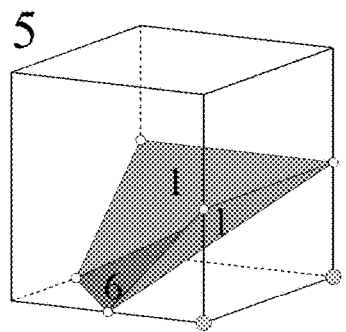
Figure 3:
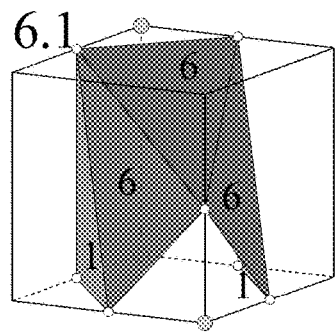
Figure 3:
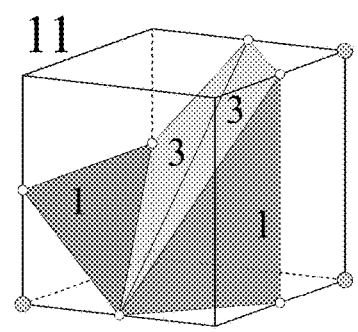

(7) The connectivity modification method in remeshing technology is used, that is, under the condition of ensuring that the vertices of each triangle are unchanged, the connection relationship between vertices is modified so as to modify the composition of each edge of the triangle; in this process, the equivalent edge with good performance is often used to replace the equivalent edge with excellent performance, thus completely eliminating the equivalent edge with the worst quality performance in some cases, as shown in FIG. 3.

(8) For the worst equivalent edge that cannot be eliminated by the connectivity modification method, that is, no matter how the connection mode of the edge is modified, the equivalent edge 2 will always exist; the triangle quality is improved through the following sub-steps:

(8.1) All triangles in the cube cell are traversed, the length of each edge of each triangle is recorded, and the edge of the longest triangle in the cell is found out.

(8.2) The midpoint of the longest edge of the triangle recorded in (8.1) is selected inside the cube cell, a new vertex is inserted at this position, and then other triangle vertices are respectively connected to the newly inserted vertex, so as to completely eliminate the worst equivalent edge in the remaining cases.

(9) The active edge is moved such that it is more perpendicular to the isosurface to improve the quality of the triangle, which includes the following sub-steps:

(9.1) For each active edge, the gradient direction from the two end points of the active edge to the isosurface and the vertical direction of the gradient direction are calculated.

(9.2) One end point A of the active edge is taken as a starting point, drawing an extension line along the vertical direction of the gradient direction from the starting point to the isosurface, the other end point B of the active edge is taken as a starting point, and drawing an extension line along the gradient direction from the starting point to the isosurface; similarly, the two end points are exchanged, the other end point B of the active edge is taken as a starting point, drawing an extension line along the vertical direction of the gradient direction from the starting point to the isosurface, one end point A of the active edge is taken as a starting point, and drawing an extension line along the gradient direction from the starting point to the isosurface, thereby obtaining another intersection point; the two intersection points and the two end points form a quadrilateral, and midpoints of two edges parallel to the gradient direction in the quadrilateral are taken.

(9.3) Displacement operation is carried out on the end points of the active edge, and they are moved to the positions of the two midpoints obtained in step (10), so as to change the shape of the active edge to make the active edge more perpendicular to the isosurface to improve the quality of the triangle.

(10) The next cube cell is selected and steps (4)-(10) are repeated until all the cube cells divided in step (3) are traversed.

(11) All cube cells are spliced together, and the triangle vertices on the edges of every adjacent cube cell coincide.

(12) The triangle vertices shared by no less than 6 triangles on the edge of a cube cell are moved to the midpoint of the edge, and these triangles can be distributed in multiple cube cells; the displacement distance is modulated by a gain function, and the parameter of the gain function is set to 0.5, so as to obtain the final mesh output of the isosurface mesh.

What is claimed is:

1. A method for generating high-quality isosurface mesh in real time, the method is capable of being applied to 3D scene reconstruction and executed by a real-time graphics system, the method comprises the following steps:

(1) constructing equivalent edges of each triangle in a case of a Marching Cubes (MC) algorithm, wherein the equivalent edges represent a distribution of edges where vertices of each triangle are located, and when the distribution changes, a relative position relationship among three edges of each triangle also changes;

(2) inputting voxel data of a certain 3D model and setting an isosurface value;

(3) evenly dividing the voxel data into individual cube cells, and marking each cell vertex with a sign according to a size relationship between a value at the cell vertex and the isosurface value, wherein when the value at the cell vertex is greater than the isosurface value, marking the cell vertex with a positive sign, and when the value at the cell vertex is less than the isosurface value, marking the cell vertex with a negative sign; or, when the value at the cell vertex is greater than the isosurface value, marking the cell vertex with the negative sign, and when the value at the cell vertex is less than the isosurface value, marking the cell vertex with the positive sign;

(4) according to the signs marked in step (3), determining a case to which a current cell belongs by comparing with the case in the MC algorithm;

(5) after the case is determined, generating an index according to vertex index rules of the MC algorithm, and querying an active edge table in the MC algorithm to obtain a set of edges where the isosurface intersects the current cube cell, and obtaining the equivalent edges configuration of each triangle in the current cell according to step (1), wherein the vertex index rules of the MC algorithm comprise 256 two-dimensional arrays representing 256 configurations of the current cube cell, and the active edge table comprises hexadecimal data of an active edge of the current cube cell;

(6) evaluating quality performance of the equivalent edges corresponding to the triangle;

(7) using a connectivity modification method in remeshing technology to eliminate the equivalent edge with the worst quality performance, wherein the connectivity modification method comprises: under a condition of ensuring that the vertices of each triangle are unchanged, modifying a connection relationship between vertices so as to modify a composition of each edge of the triangle;

(8) inserting new vertices in the cell to construct new equivalent edges with regard to the worst equivalent edge which cannot be eliminated in step (7);

(9) moving the active edge to make the active edge more perpendicular to the isosurface to improve the quality of the equivalent edges of the triangle, wherein the step (9) comprises the following sub-steps:

(9.1) determining the gradient direction from two end points of each active edge of the cube cell to the isosurface and the vertical direction of the gradient direction;

(9.2) taking one end point of the active edge as a starting point, drawing an extension line along the vertical direction of the gradient direction from the starting point to the isosurface, taking another end point of the active edge as a starting point, and drawing an extension line along the gradient direction from the starting point to the isosurface; similarly, exchanging the two end points and drawing extension lines to obtain another intersection point the two intersection points and the two end points forming a quadrilateral, and taking midpoints of two edges parallel to the gradient direction in the quadrilateral as end points of a new active edge;

(10) selecting a next cube cell and repeating steps (4)-(10) until all cube cells divided in step (3) are traversed;

(11) splicing, according to a distribution of the cube cells obtained by evenly dividing the voxel data, all cube cells together in such a manner that triangle vertices on the edges of adjacent cube cells coincide;

(12) moving the triangle vertices shared by no less than 6 triangles on an edge of the cube cell to a midpoint of the edge to obtain a final mesh output, wherein the triangles is capable of being distributed in multiple cube cells, a displacement distance is modulated by a gain function, and a parameter of the gain function is set to be 0.5, and wherein the gain function is constructed for the cube cells and is configured to move the triangle vertices shared by no less than 6 triangles on the edge of the cube cell; and

(13) rendering the isosurface of the certain 3D model based on the final mesh output, and displaying rendering results on a display device to achieve real-reconstruction of a 3D scene.

2. The method for generating high-quality isosurface mesh in real time according to claim 1, wherein the step (1) comprises the following sub-steps:

(1.1) splitting a triangulation combination in an individual case of the MC algorithm into individual triangles;

(1.2) there being 8 distributions of edges where the vertices of the triangle are located, and each distribution constituting a group of equivalent edges.

3. The method for generating high-quality isosurface mesh in real time according to claim 2, wherein the step (6) comprises the following sub-steps:

(6.1) taking a ratio of a radius of an inscribed circle to that of a circumscribed circle of the triangle as a quality evaluation metric, and drawing a quality distribution map;

(6.2) according to the quality distribution map, evaluating the equivalent edge which can reach an upper quality limit but cannot reach a lower quality limit as having excellent performance; evaluating the equivalent edge which can reach the upper quality limit and the lower quality limit as having good performance; and evaluating equivalent edge that cannot reach the upper quality limit but can reach the lower quality limit as having worst performance.

4. The method for generating high-quality r isosurface mesh in real time according to claim 3, wherein the step (8) comprises the following sub-steps:

(8.1) finding out the longest edge of the triangle in the current cube cell;

(8.2) inserting a new vertex at the midpoint of the longest edge found out in step (8.1), and then connecting other triangle vertices to the newly inserted vertex respectively.

* * * * *